United States Patent [19]
Henkelman et al.

[11] Patent Number: 5,902,392
[45] Date of Patent: May 11, 1999

[54] PAINT FOR NONHAZARDOUS REMOVAL OF HEAVY METALS AND METHOD FOR USING THE SAME

[75] Inventors: Michael L. Henkelman, Merrill; Michael Bruce Prenosil, Schofield; Robert Todd Meyers, Wausau, all of Wis.

[73] Assignees: RMT, Inc., Madison; Hoffer's Coatings, Inc., Wausau, both of Wis.

[21] Appl. No.: 08/675,614

[22] Filed: Jul. 3, 1996

[51] Int. Cl.$^6$ .......................... C09D 5/00; C09D 191/02; A62D 3/00

[52] U.S. Cl. .................... 106/260; 106/253; 106/287.29; 106/287.32; 523/103; 523/177; 524/46; 524/47; 524/28; 524/394; 524/417; 524/420; 588/901

[58] Field of Search .................................. 106/253, 260, 106/287.29, 287.32; 523/103, 177; 524/28, 46, 47, 394, 417, 420; 588/901

[56] References Cited

U.S. PATENT DOCUMENTS

| | | | |
|---|---|---|---|
| 5,037,479 | 8/1991 | Stanforth | 106/691 |
| 5,421,897 | 6/1995 | Grawe | 134/6 |
| 5,637,355 | 6/1997 | Stanforth et al. | 427/341 |

FOREIGN PATENT DOCUMENTS

WO 95/14061  11/1994  WIPO.

OTHER PUBLICATIONS

CA109:212249, Shcherbina et al, "Compounding neoprene with superphosphate waste product", Jul. 23, 1988.

CA 85:158730, Szamoskozi et al, "Agricultural soil stabilizer compositions", Jun. 28, 1976.

CA 81:50621, Ohhara et al, "Adhesive compositions for wood and paper", Jan. 25, 1974.

CA 81:38465, Ohhara et al, "Plywood adhesive compositions", Jun. 3, 1974.

The TDJ Group, Inc., Cary, Illinois, Blastox®, Blasting Additive for Lead Abatement (No date avail.).

Curt M. Gustafson et al, Stabilizing Lead–based Paint Waste, The Military Engineer, Aug.–Sep. 1994, No. 565.

Vincent Hock et al, Help in Cutting Lead Paint Abatement Costs on its Way . . . , American Public Works Association, May 1995.

*Primary Examiner*—David Brunsman
*Attorney, Agent, or Firm*—Andrus, Sceales, Starke & Sawall

[57] ABSTRACT

This invention involves a novel paint formulation comprising a phosphate or metal sulfide heavy metal reactive compound, a binder, a solubilizing compound and a buffer which acts as a carrier for heavy metal reactive chemicals so that when this novel paint is applied to a heavy metal painted surface and both are subsequently removed, the heavy metal paint waste is rendered non-hazardous under the TCLP test.

8 Claims, 1 Drawing Sheet

PAINT FOR NONHAZARDOUS REMOVAL OF HEAVY METALS AND METHOD FOR USING THE SAME

FIELD OF THE INVENTION

This invention relates to a novel paint coating formulation to carry additives for detoxifying heavy metal wastes in general, and for detoxifying lead paint in particular. The invention also includes a method for utilizing the novel paint for detoxification.

BACKGROUND OF THE INVENTION

Lead in the form of $Pb_3O_4$, known as "red lead," has been widely used in rust-inhibiting paints and primers for iron and steel. Other lead compounds have also been important in paint pigments. Lead chromate, $PbCrO_4$, is a brilliant yellow and is used in road markings. A mixture of $PbCO_3$ and $Pb(OH)_2$, is the traditional formulation of the pigment used in white paint. In the last twenty years, lead-based pigments for use in household paints have been abandoned. Lead is a toxic heavy metal and the sweet flavor which it can impart to paints has been the cause of incidents of lead poisoning among small children who eat paint flakes. Due to a heightened awareness of the danger of the release of heavy metals into the environment, the abandonment of lead pigment from structures such as bridges, watertowers and heavy machinery has also resulted. The massive historic use of lead-containing paints on these same structures has lead to considerable costs and difficulty in their maintenance. Bridges watertowers, heavy equipment and the like, must periodically be stripped of their paint coating and repainted. This stripping of lead-based paints can result in releasing considerable amounts of lead into the environment.

Safe elimination of these hazardous materials is gaining more attention due to the new Environmental Protection Agency (EPA) laws imposed because of the extreme toxicity of many of the resulting lead waste products. Wastes from lead paint removal are often hazardous due not only to the high lead content but also from the presence of zinc, cadmium, copper, nickel, barium and other heavy metals present. Handling and disposal of these hazardous wastes is far more complicated and expensive than if they were nonhazardous.

A key element of the EPA regulatory scheme for protecting the environment from heavy metal toxins is determining when regulations apply. A material such as lead paint is not a toxic waste when it is fulfilling its intended purpose as a protective coating on a bridge or structure. Hence, there is a regulatory and logical distinction between toxic materials and toxic wastes. The distinction is that many toxic materials perform useful and even essential functions in our society and it is only the improper disposal thereof that causes harm to the environment. However, once a toxic waste is generated by sandblasting a bridge to remove lead paint for example, the sandblasting operation is considered to generate a toxic waste material which falls under the governing EPA regulations. Thus, it is extremely beneficial if the lead paint is rendered nonhazardous prior to its removal from the surface. This eliminates the production of hazardous wastes thereby avoiding the requirement of adhering to strict EPA regulations since no hazardous wastes are ever produced. This reduces costs greatly and simplifies the methods of handling and disposal of the resulting nonhazardous waste.

The EPA laws and regulations recognize the distinction between lead which is soluble and, therefore, hazardous and lead which is not soluble and, therefore, nonhazardous. This recognition comes about in terms of tests which define the toxicity of the material by the amount of lead which can be leached from a waste sample under standard test conditions. Environmental regulations which have been drawn up to deal with heightened awareness of lead as a source of toxicity in the environment has divided all materials into two classes, toxic and nontoxic wastes. Toxic wastes are defined by a standard test which determines the leachability of a toxin such as lead. The most common test which is used by the EPA is the Toxicity Characteristic Leaching Procedure (TCLP) which measures the amount of leaching of various hazardous contaminants from a solid waste.

The chemistry involved behind rendering leaded paint nonhazardous is controlled both by the pH as well as by forming insoluble compounds with the lead. Any chemical compound or element which achieves those goals can be used, however, a compound containing phosphorus and a pH buffer may sufficiently bind the lead and cause a favorable pH condition, thereby immobilizing it.

U.S. Pat. No. 5,637,355 entitled "Method of Nonhazardous Removal of Paint Containing Heavy Metals and Coating Preparation for Same" by Robert Stanforth and Paul Knopp outlining this technology is herein incorporated by reference.

Current techniques to avoid EPA regulation by eliminating generation of a hazardous waste include adding lead-reactive treatment chemicals directly to the blasting media. As the lead paint is removed by blasting, it is mixed with the treatment chemicals present in the blasting media. Due to the fact that the treatment chemical is directly added to the grit of blasting media (e.g. sand or zircon) and preblended, and subsequently blasted on the steel surfaces of bridges, watertowers, etc., production of hazardous wastes is avoided. Typically, the lead-reactive chemical is a cement-type compound. This method has several drawbacks. First, this method produces excessive dusting resulting in personnel safety hazards, reduced visibility and breathing control problems for workers. Additionally, the cement treatment additives to the grit must be in a fairly high dose of approximately 20%. The cement treatment chemical is not a good cutting medium (not as good as the zircon or sand grit) and, therefore, the cutting efficiency of the blasting is reduced by 20%, resulting in the lead paint removal taking 20% longer.

Another method of rendering the lead paint nonhazardous is via a treatment process which introduces an additive which renders heavy metals nonhazardous to a coating preparation formula. This coating preparation is then applied over an existing lead paint before the lead paint is removed from the surface. The lead paint is thereby rendered nonhazardous before it is removed from its surface and becomes a waste material. A problem associated with this method is that there are no coating preparations currently available which would sufficiently carry the lead-reactive compound and have properties to facilitate proper treatment.

The key to the present invention is producing an adequate carrier for the lead-reactive additives. In the present invention, this carrier for the lead-reactive additive is a paint formulation. This paint must contain a sufficient quantity of the lead treatment additives which will immobilize the lead contained in the paint. It is also important that the carrier be able to hold substantial amounts of the lead reactive additives without having to be repeatedly applied or result in extremely thick layers of carrier to the lead-painted surface. Also, it would be advantageous if the carrier paint holds the lead treatment additives uniformly throughout thereby enabling the entire leaded surface to be treated in a consistent manner. In addition, it would be advantageous if the carrier paint could be removed by a number of different lead-paint removal systems such as sandblasting and other hard grit methods as well as soft grit methods utilizing water, plastic or even simple mechanical wire brush means. The TCLP test requires that the waste materials be water-soluble and, therefore, the carrier paint should be water-soluble for sufficient TCLP testing. The carrier paint should be able to cover and be subsequently removed from a myriad of different surfaces including steel, wood surfaces, gypsum, dry wall and plaster boards. The carrier paint must have the ability to coat leaded surfaces using conventional means ranging from an airless spray gun to a roller or brush and yet properly cover the lead-painted item with adequate thickness and consistency.

A problem encountered with simply utilizing off-the-shelf paints as the carrier is that off-the-shelf formulas do not provide some or all of the aforementioned characteristics for a number of reasons.

SUMMARY OF THE INVENTION

The present invention involves a novel paint formulation which acts as a carrier for heavy metal reactive chemicals so that when this novel paint is applied to a heavy metal painted surface and both are subsequently removed, the heavy metal paint waste is rendered nonhazardous under the TCLP test. Specifically, this novel paint carrier has a lead-reactive additive which renders lead paint waste nonhazardous upon its removal.

This novel paint meets all the criteria mentioned above in that it is an adequate carrier for a lead-reactive additive in sufficient quantities to immobilize the lead. This carrier paint also does not need repeated applications or require thick layers in order to sufficiently render the waste nonhazardous. The novel paint is also fast drying, works with great uniformity and consistency, resists dripping and running, and can be applied on a myriad of surfaces as well as removed with a wide range of removal techniques.

In addition, this novel paint has great advantages over the aforementioned prior art method of pre-blending treatment chemicals with grit. Since the present invention is directly painted onto the leaded surface, it can be removed with 100% grit thereby creating a very efficient alternative to the pre-blending prior art method which reduces grit content by 20%. In addition, the present invention does not produce the dusting problems associated with the prior art cement pre-blend. Conversely, the present invention can be used on nonmetallic surfaces as well as steel and can be removed with a standard sand blasting technique or any other type of hard grit method as well as mechanical, chemical or high water pressure removal. The removal can even include dry ice and bicarbonate soda removal techniques as well as other soft removal techniques to strip off the lead surface. The alternate non-metallic surfaces can include drywall, gypsum and plaster boards. Due to the present invention's ability to be used on a myriad of surfaces and its compatibility with various removal techniques, it can be utilized on interior surfaces, unlike the prior art techniques.

DETAILED DESCRIPTION OF THE INVENTION

Figure 1:
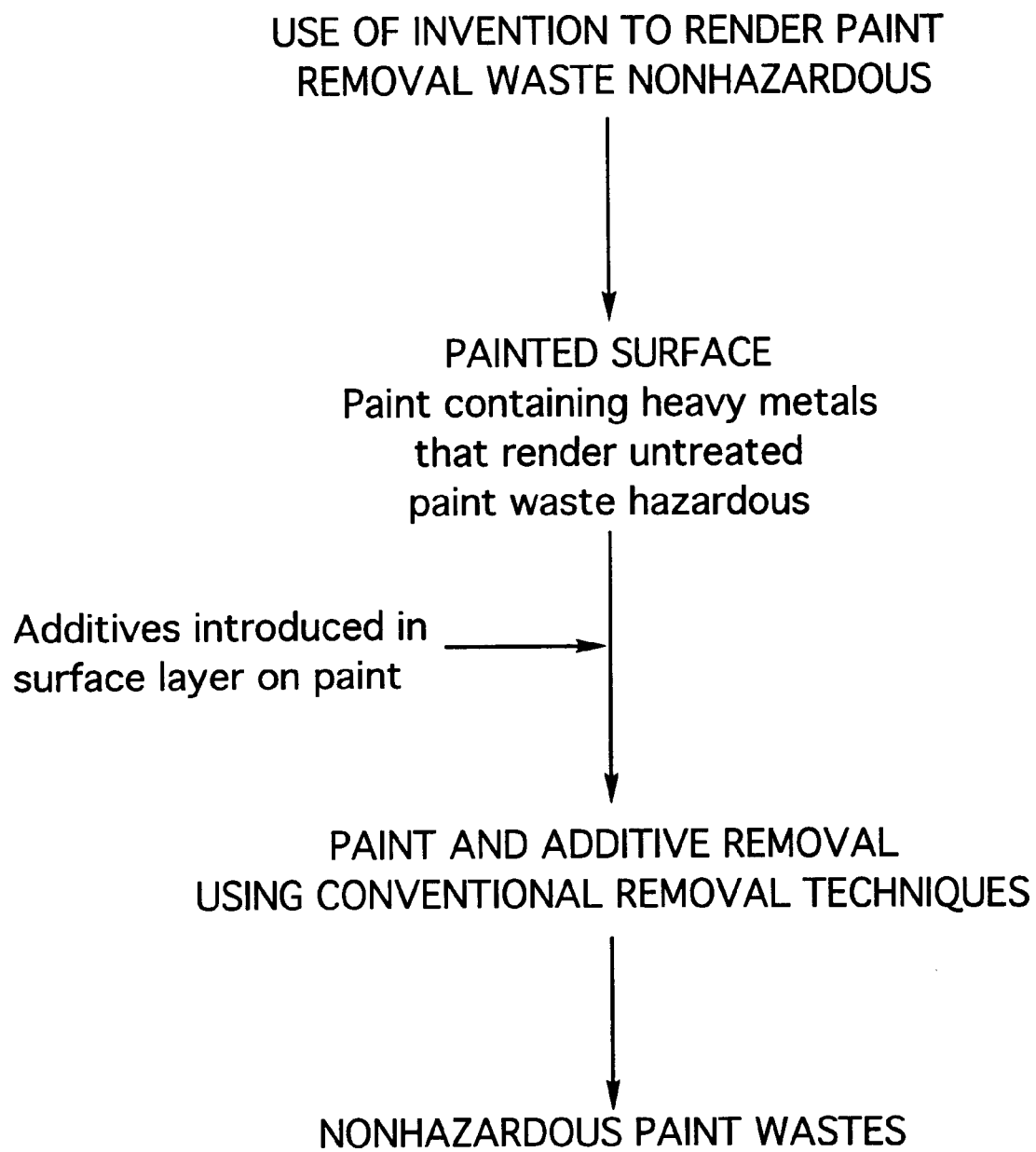
FIG. 1 represents the novel method to render paint removal waste nonhazardous.

The present invention involves a novel carrier paint composition for removing paint containing heavy metal from a surface without the production of hazardous wastes. Specifically, this invention involves applying the novel paint coating preparation to a paint containing heavy metal prior to its removal, as illustrated in Table 1. This novel paint carrier or coating contains an additive which reacts with the heavy metal thereby immobilizing it and rendering it nonhazardous according to the TCLP test. Specifically, this paint coating contains a lead-reactive additive thereby rendering lead paint nonhazardous prior to its removal.

This novel paint coating can be solvent or water-based. This paint coating not only contains the lead-reactive additive which renders the waste nonhazardous but also has a binder which is generally the "transport vehicle" which holds or encapsulates the lead-reactive additive. The lead reactive additive may be a phosphorous containing compound, such as triple super phosphate (TSP) and may include a buffer such as magnesium oxide (MgO).

The binder also assists in adhering the paint coating to the leaded surface. Polyvinyl acrylic is a good binder and the polyvinyl acrylic preferred in this invention has the product code of Aquamac 454 and/or UCAR 367. Styrenated acrylic or 100% acrylic can also be used, marketed as Aquamac 260 and Aquamac 430, respectively. Other binders contemplated within the scope of this invention are vinyl acrylic, vinyl acetate, acrylics, solution acrylics and long oil alkyds, styrene butadiene rubber, polyurethane dispersions, and epoxy.

The preferred styrene butadiene rubber is marketed under the trademark Rovene which is a carboxylated styrene butadiene latex produced by Mallard Creek Polymers, Inc.

The solution acrylic also is marketed by S. C. Johnson Wax Specialty Chemicals under the Joncryl 55 trademark. The Joncryl 52, Joncryl 56, Joncryl 58 and Joncryl 61 can all be used within the scope of this invention including the full line of the Joncryl resin solutions.

The level or amount of the binder is also important. If too much binder is added to the paint, it binds the lead-reactive compound so tightly that it is unable to react with the lead itself. If the amount of binder is too low, the resulting waste material is too dusty and this raises safety problems as well as reduces the efficacy of the hazardous waste treatment in general. The amount of binder is discussed below.

Also needed in the paint formulation is a solubilizing compound. The preferred solubilizing compound is polyvinyl alcohol which generally decreases water resistance. When polyvinyl alcohol is present and the paint coating comes in contact with water, it subsequently dissolves. The polyvinyl alcohol actually "weakens" the system to the point where the binder, such as vinyl acrylic, will loose its binding properties once it comes into contact with water as a result of the presence of the polyvinyl alcohol and thereby "unencapsulating" the phosphate and magnesium oxide allowing it to chemically react and treat the lead present on the surface. Polyvinyl alcohol also allows solubility of the paint coating thereby enabling a TCLP test to be passed. Without the polyvinyl alcohol, the paint would not be usable for lead paint treatment. The polyvinyl alcohol can be substituted with ethylcellulose, alginates, starch or carboxylated laticies.

The polyvinyl alcohol which is preferably used within the scope of this invention is Quikmask marketed by Aqua Tech.

Another important ingredient of this novel paint is the presence of a dispersant. The dispersant allows this novel paint coating to be utilized in an airless spray rig. It is important that the paint coating be able to be used in an airless system due to the fact that the airless spray gun is standard in the industry. It is important that this novel paint work with all application methods. The preferred dispersant in the formula is a titanate. A titanate is a titanium compound from a group of compounds called coupling agents which includes titanate, zirconates and aluminates. The titanate and zirconate coupling agents preferably are methyacrylide functional amines produced by Kenrich Petrochemicals.

Also used as a coupling agent is silane. Silanes have the general formula of an organic silane $R_nSiX_{(4-n)}$. The X group is involved in the reaction with the inorganic substrate. The bond between X and the silicon atom in coupling agents is replaced by a bond between the inorganic substrate and the silicon atom. X is a hydrolyzable group, typically alkoxy, acyloxy, amine or chlorine. Most common alkoxy groups are methoxy and ethoxy, which give methanol and ethanol as by-products during coupling reactions. R is a non-hydrolyzable organic radical that possesses a functionality with enabled coupling agent to bind with organic resins and polymers. Most of the widely used organo silanes have one organic substituent.

Another preferred chemical which works well as the dispersant is marketed under the trademark Tamol, a sodium salt of a polymeric carboxylic acid.

The selection of the dispersant is also related to the thickness of the coating. The thickness is important due to the fact that there must be an adequate thickness in order to introduce sufficient lead-reactive treatment compounds with the paint being treated. The dispersant allows this novel paint to carry more lead-reactive chemicals per volume. The thickness of this paint coating will be discussed further below.

Another important additive to the novel paint are the rheological additives which are imperative to the "non-sag" qualities of the coating. The Theological agents or thickeners provide an "anti-sag" characteristic of this paint coating which allows the paint coating to be applied at adequate film thickness. In other words, once the paint coating is sprayed on, it is important that it stay on and not drip off its surface. This thickness is required due to the fact that there must be a sufficient amount of lead reactive chemical per square foot in order to provide sufficient quantities to react with all the lead present and to thereby render it nonhazardous. However, with such thick layers the paint tends to sag unless it has the presence of the rheological agent, such as cellulose. The preferred cellulosic thickener contemplated in this application is marketed under the trade name Natrosol. A substitute for cellulose would be urethane thickeners or alkali swellable compounds, which are commonly called associative thickeners. The thickener can also include alginates, methylcellulose and ethylcellulose.

Regular paint is typically applied in 2 wet mil (for the purpose of this invention, mil indicates 1/1000 of an inch wet) minimums and 10 wet mil maximum. This invention works optimally at approximately 20 wet mil thickness. However, this novel paint coating will work anywhere from a range of approximately 3 mil to approximately 50 mil and still adequately treat the lead in the original paint coating. Specifically, the rheological additives allow this novel paint to be a thixotropic solution.

The preferred formula of this invention for the treatment of lead and paint is solvent at about 37.5%, titanate at 0.4%, triple super phosphate (TSP) at 20%, magnesium oxide (MgO) at 16%, polyvinyl alcohol at 15%, cellulosic at 0.4% and the vinyl acrylic at 11%.

The water or solvent can range from about 34%–44%. Titanate can range from about 0.15%–0.6% or can be used in the range of approximately 0.1%–5.0% of the combined weight of TSP and MgO. The combined weight of TSP and MgO can range between approximately 1–8 lbs. per gallon of coating.

The polyvinyl alcohol ranges from about 10% to about 25%. The polyvinyl alcohol is a 10% solid solution in water meaning that the dry weight of the polyvinyl alcohol and the dry film is approximately 1.5%. Its level can be varied between about 0.1% and 100.0% of the binder. The binder is the total weight of the polyvinyl alcohol plus vinyl acrylic.

The thickener can range from anywhere to approximately 0.0% to approximately 5.0% of the total formula. The vinyl acrylic is a 55.0% solids emulsion (approximately) in water meaning that the dry weight of the vinyl acrylic and the dry film is about 6.0%. The vinyl acrylic can range from approximately 7.0%–15%. Its level can be varied from between approximately 0.1% and approximately 100% of the binder.

The cellulosic ranges from about 0.3%–1.5%.

The ratio of MgO to phosphate is about 1–1.25. However, this ratio has unlimited variability depending on the specific application.

The TSP ranges from about 15%–40% and the MgO from about 5%–20%.

In regards to the specific formula above, it can be written in a more generic or general way with slighty different percentages such as the solvent at about 37.5%, the dispersant at approximately 0.4%, the lead-reactive compounds at approximately 31.0–37.0%, the buffer at approximately 16.0% the rheological agent at about 0.1% and the binder at about 26% based on solids discussed above which results in the dry weight of the binder being approximately 7.5 in the dry film.

The novel coating primarily may contain any number of forms of heavy metal reactive compounds. If lead is the heavy metal, then phosphate may be used as the key lead-reactive (heavy-metal reactive) material. Examples of phosphate compounds within the scope of this invention added to the novel paint coating include TSP. Other forms of phosphate in addition to TSP are effective for remidiation such as a group of phosphorus containing chemicals such as calcium phosphate, single super phosphate, trisodium phosphate, phosphoric acid, sodium hydrogen phosphate, or polyphosphoric acid.

Over 200 different phosphorus containing compounds have been described. All are ortho-phosphates and contain the $PO_4^{3-}$-ion or its derivatives. While not all phosphorus compounds may be as effective as others, the effectiveness can be readily determined by applying the TCLP test to a mixture of particular phosphorus compounds and lead paint. The second step involves incorporating the compound which successfully passes the first test into the paint composition of the present invention. Any phosphorus compound which is sufficiently soluble so as to produce the $PO_4^{3-}$-ion or its derivatives available in concentrations of approximately 10–20 parts per million will provide an effective compound for reacting with soluble lead. Conversely, phosphorus salts which have cations such as $NH_4$ are undesirable as cations and can form soluble salts of lead.

The lead reactive chemicals may also include metal sulfides such as barium sulfide, zinc sulfide and organic sulfide such as sodium dithiocarbamate. These chemicals react with the heavy metals rendering them nonhazardous.

Phosphate, alone or in combination, with buffers such as magnesium oxide or magnesium hydroxide, separately or in combination, is added to this novel paint and introduced to lead (or other heavy metal) containing paint prior to paint removal thereby rendering waste created from the process nonhazardous. Sodium carbonate, sodium bicarbonate, calcium carbonate, agricultural lime and water softening sludge from municipal water softening plants can also be used as a buffer.

After application, the lead paint and paint coating preparation are then removed from the surface using standard paint removal techniques. The paint-removal methods applicable in conjunction with this invention would generally be all types of paint removal in commercial use today. Techniques can range from the mechanical abrasion, such as scraping the lead paint from a surface by hand or subjecting lead painted items to ball mill techniques, or to the use of strong chemicals.

Specifically, techniques include dry blasting, including various types of grit such as silica sand, staurolite mineral (Starblast™), coal slag and other slag products, garnet, steel grit, glass, zircon, etc. Wet blasting, which includes any of the aforementioned grits plus some quantity of water added to control dust, is also utilized.

Soft grits, wet or dry, utilizing bicarbonate of soda, dry ice, plastic beads, and even walnut shells, corn cobs, and other organic materials are also contemplated for use with this invention.

Sponge-blast, high-pressure water blast, chemical strippers (e.g. paint-on, scrape off, similar to refinishing antique furniture) are also capable for use with this invention.

Mechanical paint removers such as needle gun, grinders and sanders can also be used as well as hand-paint removal methods such as using putty knife or wire brush.

The paint removal methods which can be used in conjunction with this application besides sand blasting also include water jetting, power tool cleaning utilizing needle guns, scaling hammers, wet abrasive blasting and vacuum blasting.

Other surfaces which can be coated with this invention and subsequently removed include concrete, asphalt, wood, composites, non-ferrous metals such as aluminum, brass, etc., galvanized steel and plastic. More delicate surfaces may require careful chemical removal to prevent damage or destruction of the substrate. Hard, durable surfaces such as heavy steel plating can be cleaned or stripped by relatively fast abrasive methods, such as sand blasting.

Composite materials such a plastics or epoxy, which often contain fiber such as glass strands, graphite, Kevlar or the like for reinforcement, may require applying a granular media substantially composed of particles of a material which has a Mohs scale hardness lower than 3.5 to remove the paint, which is outlined in U.S. Pat. No. 4,731,125 herein incorporated by reference. The granular media is accelerated using media propelling means to produce a substantially and continuous media flow on to the paint surface in order to remove the paint.

As one can see, there are a myriad of different methods for removing the lead paint (with the coating preparation) and all are contemplated as being within the scope of this invention.

This coating preparation can be applied to any surface coated with lead paint. Specifically, it can be used for outdoor surfaces of building, bridges, industrial machinery, petroleum tanks and the like. Additionally, it can be used on indoor surfaces such as walls, floors and ceilings of homes or business.

The various non-metallic surfaces which can be coated with this novel paint include wood trim or walls in houses and buildings, wood siding on homes and buildings, plaster, drywall, office furniture (wood, plastic and steel), cement and asphalt.

Of course, steel structures can also be coated with this novel paint, such as bridges, water towers, petroleum and chemical tanks, industrial buildings and steel equipment (e.g. military tanks, autos, trucks, artillery, cranes, ships, railroad cars and airplanes).

EXAMPLE 1

Test Results

Bench-scale tests were conducted on "pseudo-waste" (lead paint chips and blast grit and paint carrier coating) created in a laboratory. The approximate mix was approximately 98% grit and 1% lead paint chips and 1% (±) paint carrier coating. The paint carrier coating utilized in Example 1 is the preferred embodiment as follows: water content at 37.5%, titanate at 0.4%, triple super phosphate at 20%, magnesium oxide at 16%, polyvinyl alcohol at 15%, cellulosic at 0.4% and the vinyl acrylic at 11%. Example 1(A) utilizes lead paint chips obtained from one bridge and Example 1(B) utilizes lead paint chips obtained from a second bridge at another location.

|  | TCLP Leachable Load mg/kg | Total Load mg/kg |
|---|---|---|
| A. Bridge #1 |  |  |
| Untreated Sample | 8.4 | 4,000 |
| +0.4% paint carrier coating | 4.4 | 4,000 |
| +0.7% paint carrier coating | 3.9 | 4,000 |
| +1.0% paint carrier coating | 2.0 | 4,000 |
| +1.3% paint carrier coating | 2.2 | 4,000 |
| B. Bridge #2 |  |  |
| Untreated Sample | 6.0 | 4,300 |
| +0.4% paint carrier coating | 1.7 | 4,300 |
| +0.7% paint carrier coating | 2.3 | 4,300 |
| +1.0% paint carrier coating | 1.4 | 4,300 |
| +1.3% paint carrier coating | 0.89 | 4,300 |

EXAMPLE 2

These results achieved with paint carrier coating consisting of approximately 40% by weight treatment chemicals in a 1:1 ratio of MgO:TSP. The paint carrier coating has the same formula as set forth in Example 1.

|  | TCLP Leachable Load mg/kg | Total Load mg/kg |
|---|---|---|
| A. Bridge #1 |  |  |
| Untreated Sample | 8.5 | 4.000 |
| +0.4% paint carrier coating | 3.5 | 4.000 |
| +0.7% paint carrier coating | 2.2 | 4.000 |
| +1.0% paint carrier coating | 2.6 | 4.000 |
| +1.3% paint carrier coating | 1.7 | 4.000 |
| B. Bridge #2 |  |  |
| Untreated Sample | 6.0 | 4.300 |
| +0.4% paint carrier coating | 2.6 | 4.300 |
| +0.7% paint carrier coating | 1.4 | 4.300 |
| +1.0% paint carrier coating | 2.3 | 4.300 |
| +1.3% paint carrier coating | 1.1 | 4.300 |

These results were achieved utilizing approximately 40% by weight treatment chemicals in a 1:1.25 ratio of MgO:TSP

EXAMPLE 3

Actual test results, using samples taken from blast residue containing: grit and old paint and paint carrier coating, from bridge site. The paint carrier coating has the same formula as set forth in Example 1. This paint carrier was coated on an actual bridge. Paint carrier was applied to this bridge at approximately 20 mils wet (1 mil=1/1000 inch) and allowed to dry prior to blasting.

| Bridge #2 | TCLP Leachable Load Mg/L |
|---|---|
| Untreated Sample (no paint carrier) | 6.0 |
| 05/10/96 Sample (with paint carrier) | 2.4 |
| 05/22/96 Sample (with paint carrier) | 0.69 |
| 06/04/96 Sample (with paint carrier) | 1.9 |

In addition to the formula described above, this invention may also be produced using 100% acrylic binder with no polyvinyl alcohol or thickeners as well as the solvent-based batch using long oil alkyd resin and dryers.

We claim:

1. A carrier coating which when applied to a surface containing a heavy metal renders said heavy metal nonhazardous according to a TCLP test, comprising:
    a heavy metal reactive compound selected from the group consisting of phosphates and metal sulfides;
    a binder selected from the group consisting of vinyl acrylic, polyvinyl acrylic, acrylics, solution acrylics, long oil alkyds, styrene butadiene rubber, polyurethane dispersions and epoxy a solubilizing compound; and
    a buffer selected from the group consisting of magnesium oxide, magnesium hydroxide, sodium carbonate, sodium bicarbonate, calcium carbonate, agricultural lime and water softening sludge from municipal softening plants.

2. The coating of claim 1 wherein said solubilizing compound is selected from the group consisting of polyvinyl alcohol, ethylcellulose, alginates, starch and carboxylated laticies.

3. The coating of claim 1 further including a dispersent.

4. The coating of claim 3 wherein said dispersent is selected from the group consisting of titanates, aluminates, zirconates, sodium salts of carboxylic acid and silanes.

5. The coating of claim 1 wherein said heavy metal is lead and said lead-reactive compound is a phosphate.

6. The coating of claim 5 wherein said phosphate is selected from the group consisting of triple super phosphate, phosphoric acid, calcium phosphate, single super phosphate, trisodium phosphate, sodium hydrogen phosphate and polyphosphoric acid.

7. A carrier coating which when applied to a surface containing lead renders the lead nonhazardous according to a TCLP test, comprising:
    a lead reactive compound comprising triple super phosphate;
    a binder comprising vinyl acrylic polymer;
    a buffer comprising magnesium hydroxide;
    a solubilizing compound comprising polyvinyl alcohol;
    a dispersent comprising a titanate; and
    a solvent comprising water.

8. The coating of claim 7 wherein said solvent comprises about 34%–44% by weight of said coating, said dispersent comprises about 0.15%–0.6% by weight of said coating, said solubilizing compound comprises about 7%–15% by weight of said coating, said buffer comprises about 5%–20% by weight of said coating, said binder comprises about 7%–15% by weight of said coating, and said lead reactive compound comprises about 15%–40% by weight of said coating, the ingredients adding up to 100% by weight of said coating.

* * * * *